US010251062B2

(12) United States Patent
Lu et al.

(10) Patent No.: US 10,251,062 B2
(45) Date of Patent: Apr. 2, 2019

(54) METHOD OF MANAGING ACCESS TO A SERVICE

(71) Applicant: GEMALTO SA, Meudon (FR)

(72) Inventors: HongQian Karen Lu, Gemenos (FR); Jean-Yves Fine, Gemenos (FR); Benoit Gonzalvo, Gemenos (FR); Aline Gouget, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/568,192

(22) PCT Filed: Apr. 25, 2016

(86) PCT No.: PCT/EP2016/059178
§ 371 (c)(1),
(2) Date: Oct. 20, 2017

(87) PCT Pub. No.: WO2016/177597
PCT Pub. Date: Nov. 10, 2016

(65) Prior Publication Data
US 2018/0091977 A1    Mar. 29, 2018

(30) Foreign Application Priority Data
May 7, 2015 (EP) .................................... 15305697

(51) Int. Cl.
*H04W 12/06* (2009.01)
*H04W 12/08* (2009.01)
*H04W 12/12* (2009.01)

(52) U.S. Cl.
CPC ........... *H04W 12/08* (2013.01); *H04W 12/06* (2013.01); *H04W 12/12* (2013.01); *H04L 2463/101* (2013.01); *H04L 2463/103* (2013.01)

(58) Field of Classification Search
None
See application file for complete search history.

(56) References Cited

U.S. PATENT DOCUMENTS 5,237,612 A * 8/1993 Raith ................. H04L 9/16
380/247
6,209,103 B1 * 3/2001 Schreiber ............ G06F 17/214
726/26

(Continued)

FOREIGN PATENT DOCUMENTS

EP        1 683 388 A       7/2006
JP        2003-338814      11/2003

(Continued)

OTHER PUBLICATIONS

International Search Report (PCT/ISA/210) dated Jun. 30 2016, by the European Patent Office as the International Searching Authority for International Application No. PCT/EP2016/059178.

(Continued)

*Primary Examiner* — Christopher A Revak
(74) *Attorney, Agent, or Firm* — Buchanan Ingersoll & Rooney PC

(57) ABSTRACT

The invention is a method for managing access to a service wherein the method comprises the following steps: a client application sends to an application server a request to access the service by using credentials and a first anti-clone code, the application server performs a verification of the credentials and said first anti-clone code, the application server sends a second anti-clone code to the client application and deactivates said first anti-clone code only in case of successful verification, said second anti-clone code being required for the next attempt to access the service.

11 Claims, 6 Drawing Sheets

(56) References Cited

U.S. PATENT DOCUMENTS

| | | | |
|---|---|---|---|
| 7,380,133 B2 | 5/2008 | Jaquier | |
| 8,301,900 B1* | 10/2012 | Juang | G06F 21/46 |
| | | | 713/184 |
| 8,643,475 B1* | 2/2014 | Kohno | G06K 19/07345 |
| | | | 235/380 |
| 8,868,923 B1* | 10/2014 | Hamlet | G06F 21/00 |
| | | | 326/8 |
| 9,747,480 B2* | 8/2017 | McAllister | G06K 7/10376 |
| 10,033,732 B1* | 7/2018 | Jiang | H04L 63/0838 |
| 2003/0163693 A1 | 8/2003 | Medvinsky | |
| 2007/0274524 A1 | 11/2007 | Ksontini et al. | |
| 2008/0289035 A1* | 11/2008 | Delia | G06F 21/31 |
| | | | 726/20 |
| 2012/0066774 A1* | 3/2012 | Kang | H04L 9/0656 |
| | | | 726/34 |
| 2012/0252411 A1* | 10/2012 | Johnsgard | G07C 9/00158 |
| | | | 455/411 |
| 2013/0124855 A1* | 5/2013 | Varadarajan | G06Q 20/3276 |
| | | | 713/155 |
| 2013/0295882 A1* | 11/2013 | Zhao | H04W 12/06 |
| | | | 455/411 |
| 2014/0026196 A1 | 1/2014 | Hayat | |
| 2014/0379597 A1* | 12/2014 | Chung | G07C 9/00571 |
| | | | 705/318 |
| 2015/0026786 A1* | 1/2015 | Alexander | H04L 63/1408 |
| | | | 726/7 |

FOREIGN PATENT DOCUMENTS

| | | |
|---|---|---|
| JP | 2006-268719 | 10/2006 |
| JP | 2007-102778 | 4/2007 |
| JP | 2008-015877 | 1/2008 |
| KR | 10-0706511 | 4/2007 |
| WO | WO 2014/014793 A1 | 1/2014 |

OTHER PUBLICATIONS

Written Opinion (PCT/ISA/237) dated Jun. 30, 2016, by the European Patent Office as the International Searching Authority for International Application No. PCT/EP2016/059178.

Notice of Preliminary Rejection dated Mar. 13, 2018 issued by the Korean Intellectual Property Office in Corresponding Korean Application No. 10-2017-7032008 With English Translation.

Yusuke Kowakame A New One-Time Authentication System Using a Cellular Phone with FeliCa Chip, Institiute of Electronics, Information and Communication Engineers Technical Report vol. 110, No. 375, Jan. 13, 2011, pp. 93-98 (with English Language Abstract) (9 pages).

Notice of Reason for Rejection dated Nov. 6, 2018 issued by the Japanese Patent Office in corresponding Japanese Application No. 2017-555460 with English Translation (9 pages).

* cited by examiner

METHOD OF MANAGING ACCESS TO A SERVICE

FIELD OF THE INVENTION

The present invention relates to methods of managing access to a service. It relates particularly to methods of managing access to a service from a client application.

BACKGROUND OF THE INVENTION

The rapid adoption of mobile devices, such as smart phones and tablets, has created a huge market for all kinds of mobile services. Users can download applications from application stores (or markets), install them onto their mobile devices, and consume services through these applications.

A mobile application is software stored and executed in a mobile device. On the one hand, users demand convenience, good user experience, and performance. To satisfy these, many mobile applications keep certain connection data (such as access token) or/and user credentials (such as password) in their local storage and in the memory at runtime. In this way, a user normally just taps the application and uses it. On the other hand, attackers have moved their attention to mobile devices. They have deployed a variety of ways distributing malware to or root users' mobile devices. This allows them to modify or steal whatever important on users' devices.

One particular problem is the cloned applications. Anyone can download a mobile application from an application store. So cloning the application itself is not the problem in this context. The concerns are user credentials and other data, such as Authentication tokens, access tokens, and API keys which mobile applications use in order to interact with remote servers of mobile services. The clone in this context meant that the mobile application, user credential, and application data are all copied to another device, and they are sufficient for the cloned mobile application to run on the other device in the name of the original user.

The same issue with cloning of application may be encountered with other types of device.

There is a need to mitigate problems caused by application cloning.

SUMMARY OF THE INVENTION

An object of the invention is to solve the above mentioned technical problem.

An object of the present invention is a method for managing access to a service. The method comprises the steps:
- a client application sends to an application server a request to access the service by using credentials and a first anti-clone code,
- the application server performs a verification of the credentials and said first anti-clone code,
- the application server sends a second anti-clone code to the client application and deactivates said first anti-clone code only in case of successful verification, said second anti-clone code being required to the next attempt to access the service.

Advantageously, the application server may have previously recorded a restoring data associated with the client application, the client application may be allocated to a user, in case of failure of the verification, the application server may ask the user to send an identity data and if the identity data is compliant with the restoring data the application server may authorize access to the service and may send to the client application a new anti-clone code required to the next attempt to access the service.

Advantageously, the application server may have previously recorded a restoring data associated with the client application, the client application may be allocated to a user, a cloned client application may been granted access to the service by using an anti-clone code stolen to the client application, the application server may ask the user to send an identity data and if the identity data is compliant with the restoring data, the application server may remove access to the service for the cloned client application, authorizes the client application to access the service and may send to the client application a new anti-clone code required to the next attempt to access the service.

Advantageously, said first and second anti-clone codes may be used by the client application as passwords or keys.

Advantageously, the client application may be embedded in a device, the application server may have has previously recorded a fingerprint of the device and said credentials may include the fingerprint.

Another object of the present invention is application server able to provide a service to a client application. The application server is configured to establish a secure and authenticated session with the client application. The application server is configured to send a first anti-clone code to the client application through said session. The application server is adapted to verify that a request sent by the client application has been correctly generated using credentials and the first anti-clone code. The application server is configured to send a second anti-clone code to the client application and to deactivate said first anti-clone code only in case of successful verification, said second anti-clone code being required to the next attempt to access the service.

Advantageously, the application server may be configured to record a restoring data associated with the client application during an enrollment stage, the client application may be allocated to a user, and in case of failure of the verification, the application server may be configured to ask the user to send an identity data and if the identity data is compliant with the restoring data, the application server may be configured to authorize access to the service and to send to the client application a new anti-clone code required to the next attempt to access the service.

Advantageously, the application server may be configured to authorize access to the service by one client entity at a time, the application server may be configured to record a restoring data associated with the client application during an enrollment stage and the client application may be allocated to a user. If a cloned client application was granted access to the service by using an anti-clone code stolen to the client application, the application server may be configured to ask the user to send an identity data and if the identity data is compliant with the restoring data, the application server may be configured to remove access to the service for the cloned client application, to authorize the client application to access the service and to send to the client application a new anti-clone code required to the next attempt to access the service.

Advantageously, the application server may be configured to check that said first and second anti-clone codes are used by the client application as passwords or keys.

Advantageously, the application server may be configured to record a fingerprint of a device embedding the client application and the application server may be configured to check that said credentials include the fingerprint.

Another object of the present invention is client application designed to access a service, said client application being configured to establish a secure and authenticated session with a first server. The client application is configured to send to a second server a request for accessing the service, the client application is configured to generate said request using both credentials and a first anti-clone code previously provided by said first server through the session and the client application is configured to ask said first server a second anti-clone code required to the next attempt to access the service, if said request has been successfully accepted by said second server.

Advantageously, the first server may store a restoring data associated with the client application, the client application may be allocated to a user and said client application may be configured to ask said first server to start a process of anti-clone code renewal based on an identity data provided by the user and intended to be check versus the restoring data by the first server, if said request has been rejected by said second server.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of client application intended to access a service whose access is protected. The service may be a communication system, a payment system or a video/music system for example. The client application may be embedded in any type of device able to establish a communication session with the server. For example the device may be a mobile phone, a tablet PC, an electronic pair of glasses, an electronic watch, an electronic bracelet, a vehicle, a meter, a slot machine, a TV or a computer.

Figure 1:
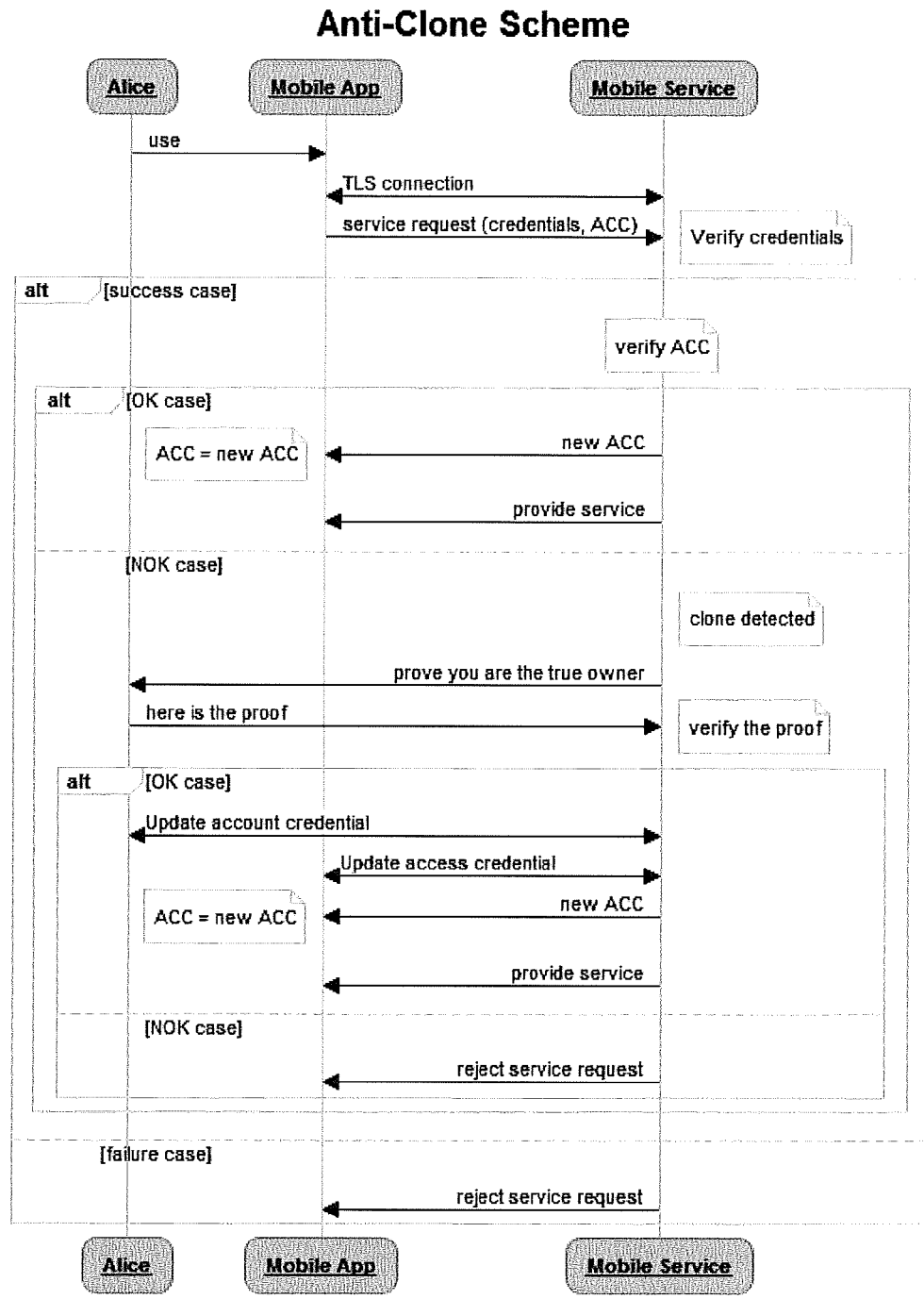
FIG. 1 depicts a flowchart showing a first example of interactions with a server according to the invention.

FIG. 1 illustrates a first example of management of the service access according to the invention.

In this example, Alice is a genuine user having her client application installed on a mobile phone. Mobile Service is a server providing services to end users through mobile applications, and App is the mobile application (i.e. client application) that is a client of Mobile Service and is running on a mobile device. For example, Mobile Service is a VoIP service.

When Alice signs up with Mobile Service, Mobile Service asks Alice to provide a mean or Mobile Service provides Alice this mean for account restore purpose. This mean will allow to identify an identity data ID intended to be send to Mobile Service for proving Alice's identity. For examples, Alice's email, Alice's cell phone number, a backup password (created by Alice), a backup key (generated by Mobile Service), a hardware token, secret questions, or some combinations of the above. One or more of these schemes enable Mobile Service to verify Alice in case Alice forgets her account credential or her account is hijacked (e.g. App is cloned, credential or access token stolen).

When a first time the App on Alice's device successfully establishes a secure and authenticated session (e.g. Alice provided her credential and Mobile Service verified it), Mobile Service sends App an Anti-Clone Code (ACC) and receives an acknowledgement. Advantageously, the ACC may have a random one-time use value. The Mobile Service trusts the App for the first use. The Mobile Service may optionally send a new Anti-Clone Code periodically during a single session.

At next time when Alice uses the App to connect to Mobile Service for the service, in addition to Alice's credential or/and access token (such as Oauth token or API key), the App sends the ACC to the Mobile Service. In addition to other verification, the Mobile Service verifies the ACC by checking:

1. if the incoming ACC is the same as in its record for this user device and
2. if incoming ACCs of similar time include one that is the same as this ACC If first checking is true, and second checking is false, the verification is successful. In this case, Mobile Service accepts App's connection, gives the App a new ACC and deactivate the used ACC. Mobile Service provides the service as usual.

Alternatively, an ACC may be valid for a predefined number of uses or for a preset duration. In this case, the ACC is deactivated only when it expires.

If the verification is not successful, Mobile Service assumes that a clone happened and will challenge the connection request by asking the user to prove the account ownership by using the restore process (also called recovery mode). For example, Mobile Service sends a onetime code to user's phone through SMS or to user's registered email, and asks the user to enter the code as a proof. Once Mobile Service can verify that Alice is the true account owner, Mobile Service asks Alice to change her account credential, e.g. change password or get a new OAuth token. Mobile Service also issues Alice's App a new ACC and receives an acknowledgement ACK.

Advantageously, the App may periodically contact the Mobile Service to obtain a new ACC even when Alice is not in use or the Mobile Service may push new ACC periodically.

Depending on the required security level, an expiration time can be set for the ACC. The more sensitive the application is, the shorter the expiration timeframe should be. In this case, if Alice has not used the App for a while beyond the expiration time, she needs to re-authenticate (e.g. through a new enrollment step or through the use of Identity data ID) to use the App.

Thanks to this example of the invention, the server can detect cloning problem, mitigate the problem, and restore services for the genuine user.

This invention works with any user authentication and client authentication schemes. It provides an additional layer of security protection.

Figure 2:
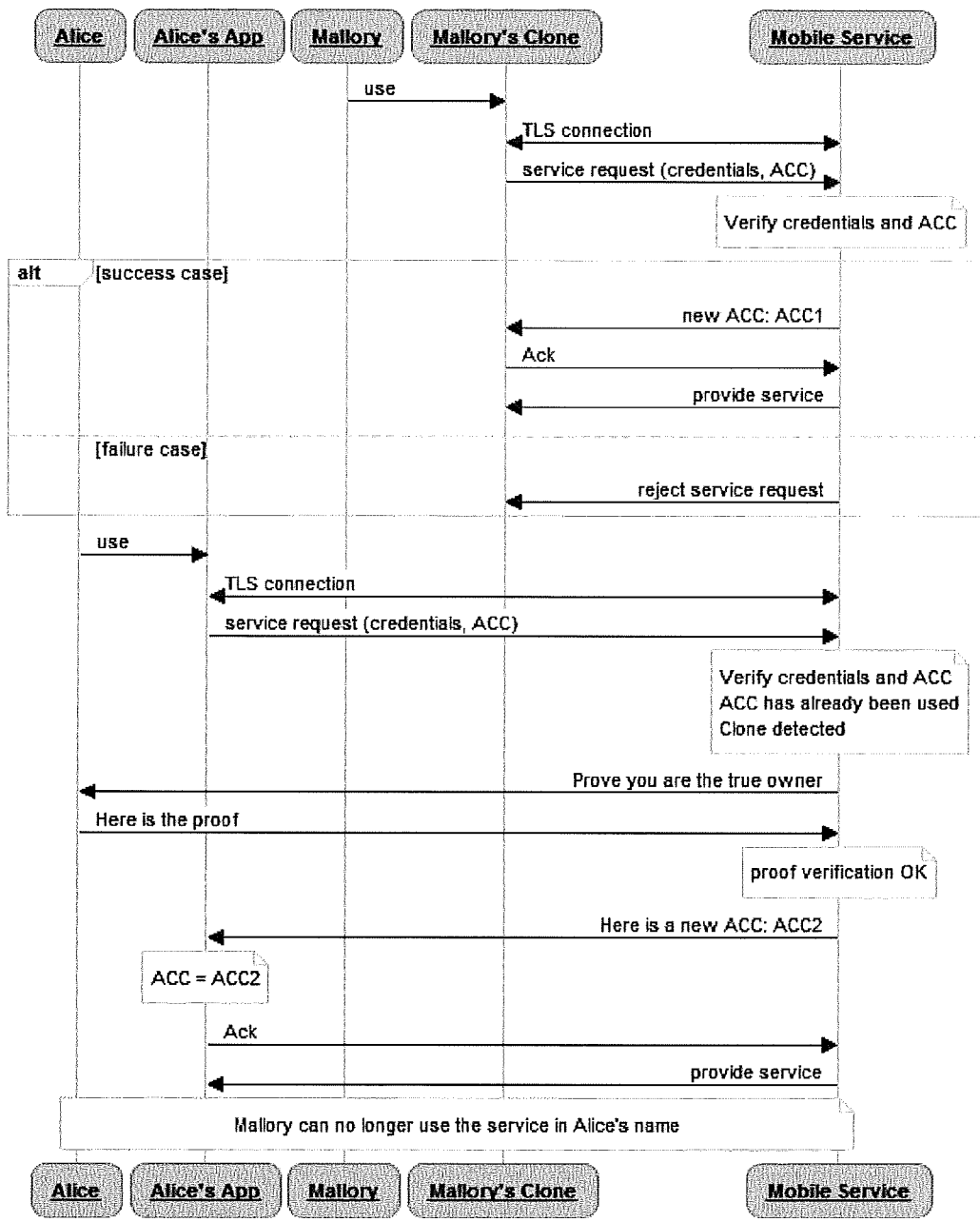
FIG. 2 depicts a flowchart showing an example of interactions with a server according to the invention when a cloned application succeeded to access the service before the genuine client application.

FIG. 2 illustrates an example of management of the service access according to the invention when a cloned application succeeded to access the service before the genuine client application.

In this example, Mallory is an attacker who cloned Alice's client application to his own device including information needed to run App, which includes the ACC and other credentials.

Mallory uses the App before Alice. Mallory's App has the ACC and Mobile Service can verify it, send it a new ACC, and provide the service. So Mallory can use the service.

Now Alice uses the App. The App sends the ACC. Mobile Service cannot verify it since Mallory's App already used it. It is to be noted that Mobile Service is configured to accept only access to the service for a particular client one at a time. Mobile Service now detected a clone but does not know which one is the clone. Mobile Service asks Alice to prove that she is the genuine account owner using one of restore mechanisms mentioned earlier. Alice can prove it.

If user credential is stored with App for convenience, Mobile Service asks Alice to, for example, change her credential. Mallory will not be able to use the service in Alice's name anymore since Alice's credential has changed.

Mobile Service will send Alice's App a new ACC. Mallory's App will not be able to access the service in Alice's name since it does not have the current ACC. Alice will be able to use the service from now on.

Figure 3:
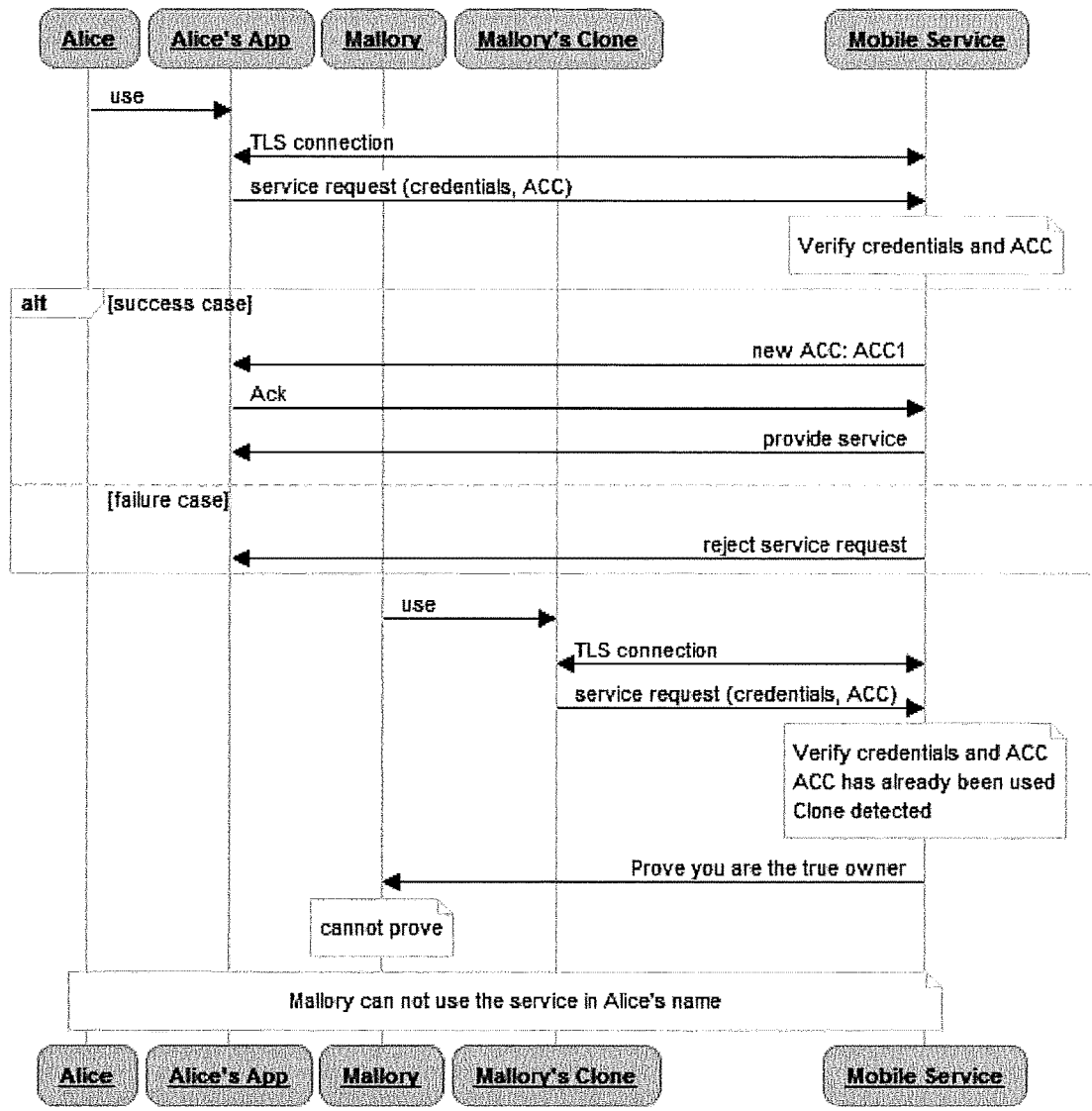
FIG. 3 depicts a flowchart showing an example of interactions with a server according to the invention when a cloned application tries to access the service after the genuine client application succeeded to access the service.

FIG. 3 illustrates an example of management of the service access according to the invention when a cloned application tries to access the service after the genuine client application succeeded to access the service.

Mallory uses the App after Alice. Mallory's App sends the ACC. Mobile Service cannot verify it because Alice's App already used it. Mobile Service detects the clone, by checking that the identifier of the client application was already granted access to the service (and is still connected) for instance. Mobile Service does not know which one is the clone and asks Mallory to prove that he is the account owner. Mallory cannot prove it since he does not have Alice's recovery mean. He can no longer use the service in Alice's name.

Figure 4:
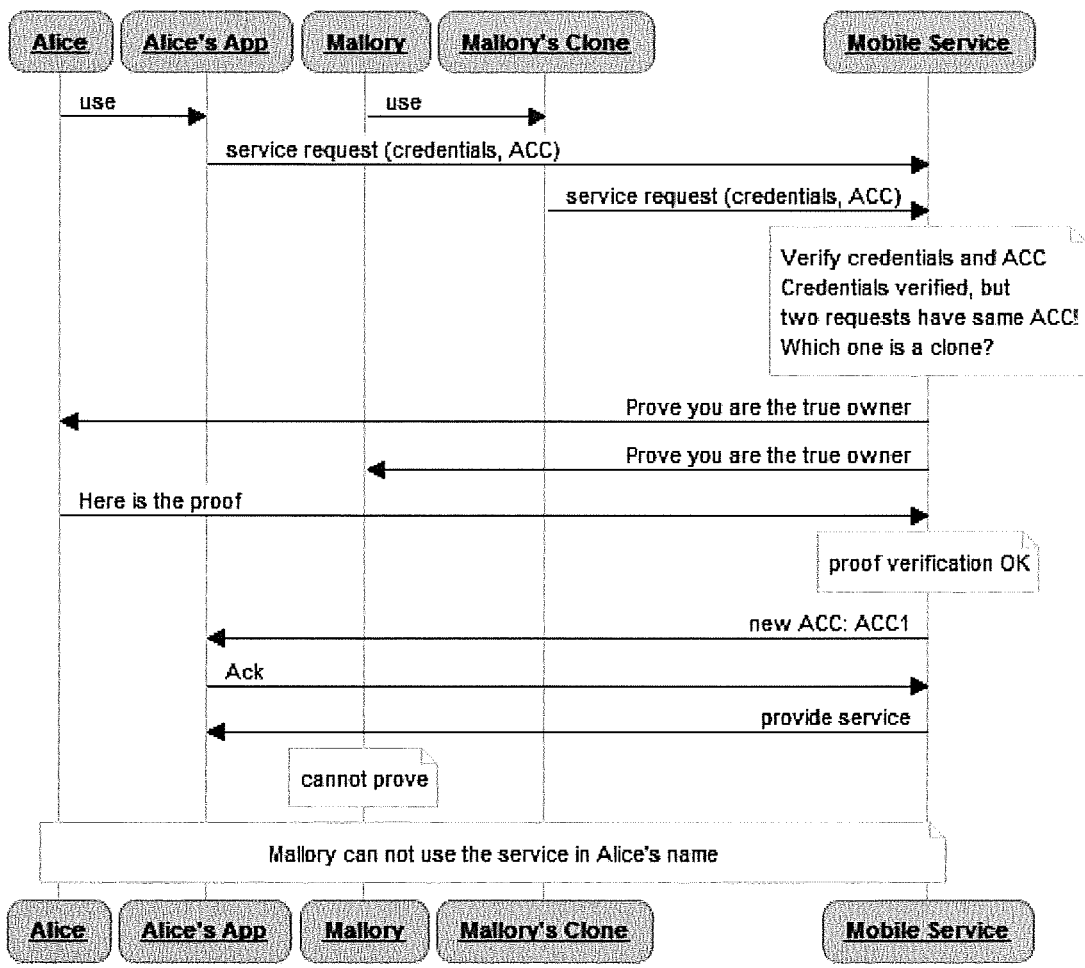
FIG. 4 depicts a flowchart showing an example of interactions with a server according to the invention when a cloned application tries to access the service at the same time that the genuine client application is trying to do.

FIG. 4 illustrates an example of management of the service access according to the invention when a cloned application and the genuine client application simultaneously try to access the service.

Mallory uses the App at the same time as Alice. The Mobile Service receives Mallory App's request and Alice App's request at the same time. Mobile Service detects a clone but does not know which App is the clone. Mobile Service asks both Mallory and Alice to prove the ownership to the account. Alice can prove it but Mallory cannot. Alice changes her account credential as needed. Her App receives a new ACC. Alice continues to use the service. Mallory will not be able to use the service in Alice's name.

Figure 5:
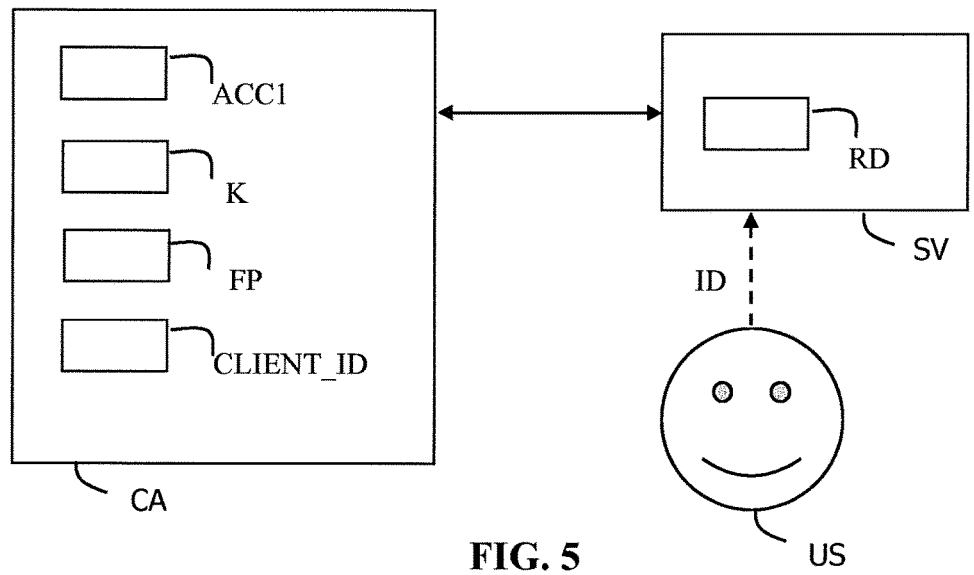
FIG. 5 is an example of system comprising a client application, a user and a server according to the invention.

FIG. 5 illustrates an example of a system comprising a client application, a user and a server according to the invention, The client application CA includes an anti-clone code ACC1, a client identifier CLIENT_ID uniquely allocated to the client application CA and a key K allowing to establish a secure session with the server SV. The client application CA is installed in a device like a tablet for instance. The client application CA may store a fingerprint FP of the device or include a component adapted to retrieve the fingerprint FP from the device.

The server SV contains a restoring data RD which has been provided to the server during an enrollment phase. This restoring data RD is allocated to the client application CA and to the user US.

When required, the user US can send the identity data ID to the server (either directly through an out-of-band channel or through the client application CA) for proving the genuineness of the client application CA. The server comprises a checking component adapted to declare the client application CA as genuine if the received identity data ID complies with the restoring data RD. For instance, both restoring data RD and identity data ID may be secret codes whose values are compared. In another example, the restoring data RD may be a hash of the identity data ID.

Figure 6:
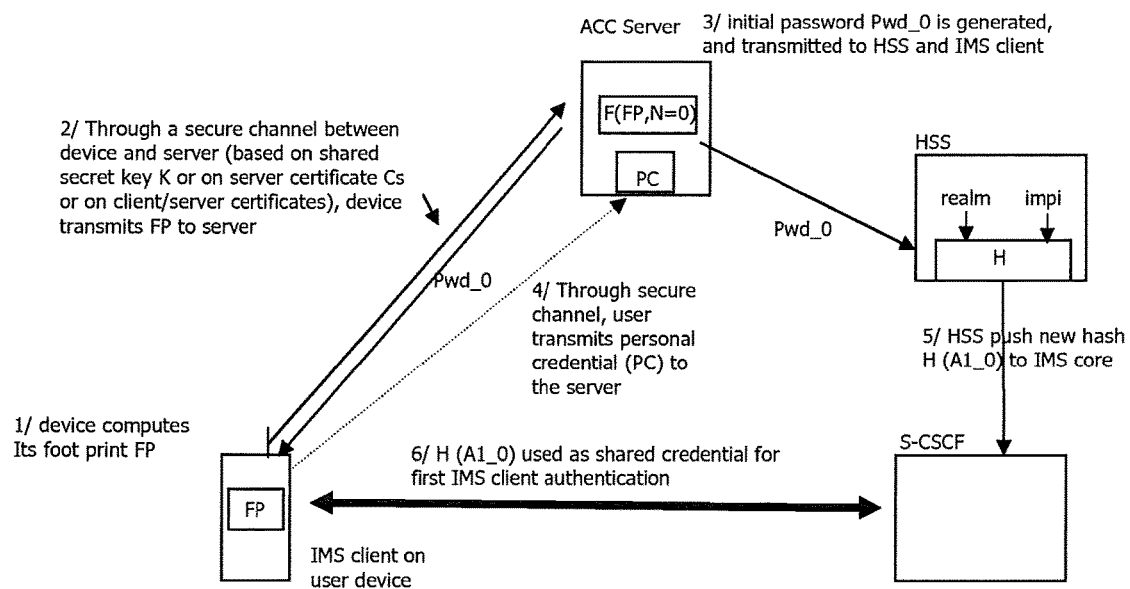
FIG. 6 is an example of diagram showing enrollment of a genuine client application to a server according to the invention in IP Multimedia Subsystem (IMS) framework.

FIG. 6 illustrates an enrollment of a genuine client application to a server according to an example of the invention in IP Multimedia Subsystem (IMS) framework.

In this example, the server comprises three parts: an ACC server in charge of the generation of anti-clone code, a HSS (Home Subscriber Subsystem) and a S-CSCF (Serving-Call Session Control Function). Here, the anti-clone codes are passwords.

The client application is an IMS client installed on a mobile device, for example a tablet. It comprises a key K shared with the ACC server.

In this example, the IMS client uses a login/password authentication mechanism as SIP digest method which is described in annex N of 3GPP TS 33.203.

At first step, the IMS client computes the footprint (fingerprint) FP of its tablet. For example, the fingerprint FP may be based on the serial number of the tablet or a combination of serial numbers of its hardware components like display and hard disk.

At second step, a secure channel is established between the IMS client and the ACC server based on the secret key K. Alternatively, the secure channel may be based on a server certificate CS or client/server certificates stored by the IMS client. Then the IMS client sends the fingerprint FP to the ACC server through the secure channel.

At third step, the ACC server generates an initial password Pwd_0 (i.e. the initial anti-clone code) using the fingerprint FP and transmits it to both to the HSS and the IMS client through the secure channel. In another example, the ACC server may be configured to generate a hash of the initial password Pwd_0 and to send this hash (instead of the password Pwd_0) to the HSS and IMS client.

In another example, the ACC server may be configured to generate anti-clone codes without using the fingerprint FP.

At fourth step, the user of the tablet is asked to send his/her personal credential PC (also named restoring data RD in previous examples) to the ACC server through the secure channel.

At fifth step, the HSS generates a hash H(A1_0) from the initial password Pwd_0 and the client identifier (also named IMPI in IMS framework). Then HSS send this hash H(A1_0) to the S-CSCF.

The IMS client is now fully enrolled and can start accessing the service thanks to shared credentials.

As shown at sixth step, the IMS client (which has the password Pwd_0) can authenticate to the S-CSCF (which has the hash H(A1_0)) using the SIP digest method.

Figure 7:
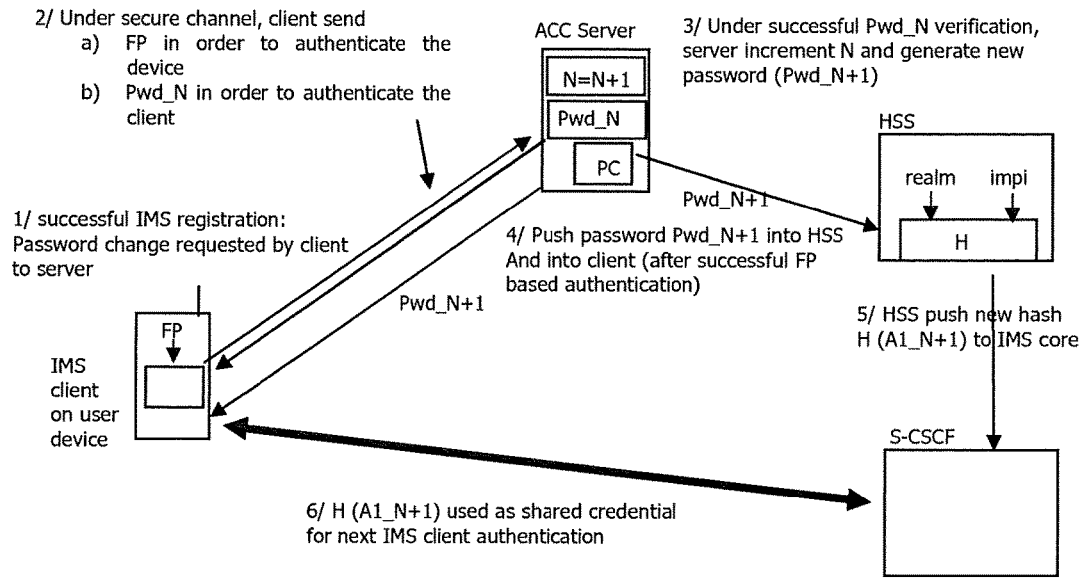
FIG. 7 is another example of diagram showing a nominal service access according to the invention in IP Multimedia Subsystem (IMS) framework.

FIG. 7 illustrates a nominal service access of a genuine client application to a server according to an example of the invention in IP Multimedia Subsystem (IMS) framework.

At first step, a successful IMS registration is assumed to have been performed based on the current active password Pwd_N. In other words, the IMS client was just granted access to the service by the S-CSCF. In a preferred example, the IMS client initiates the password change by sending a request to the ACC server.

Alternatively, the server can take the initiative to replace the current password Pwd_N with a new one.

At second step, a secure channel is established between the IMS client and the ACC server based on the secret key K. Then the IMS client dynamically gets the fingerprint FP of the tablet and sends authentication data to the ACC server. This authentication data allows the ACC server to verify that the IMS client knows the fingerprint FP and the current password Pwd_N. For example, the authentication data may comprise the password Pwd_N and a cryptogram computed from both the fingerprint, a challenge coming from the IMS client and a random value coming from the ACC server.

At third step, the ACC server verifies the received authentication data. In case of successful verification, the ACC server generates a new password Pwd_N+1.

At fourth step, the ACC server sends the new password Pwd_N+1 to the IMS client via the secure channel and to the HSS.

At fifth step, the HSS generates a new hash H(A1_N+1) from the password Pwd_N+1 and the client identifier. Then HSS send this new hash H(A1_N+1) to the S-CSCF (also called IMS core).

The IMS client has now the new anti-clone code which is required to the next access to the service.

As shown at sixth step, the IMS client will authenticate to the S-CSCF based on the hash H(A1_N+1) for the next attempt to access the service.

Figure 8:
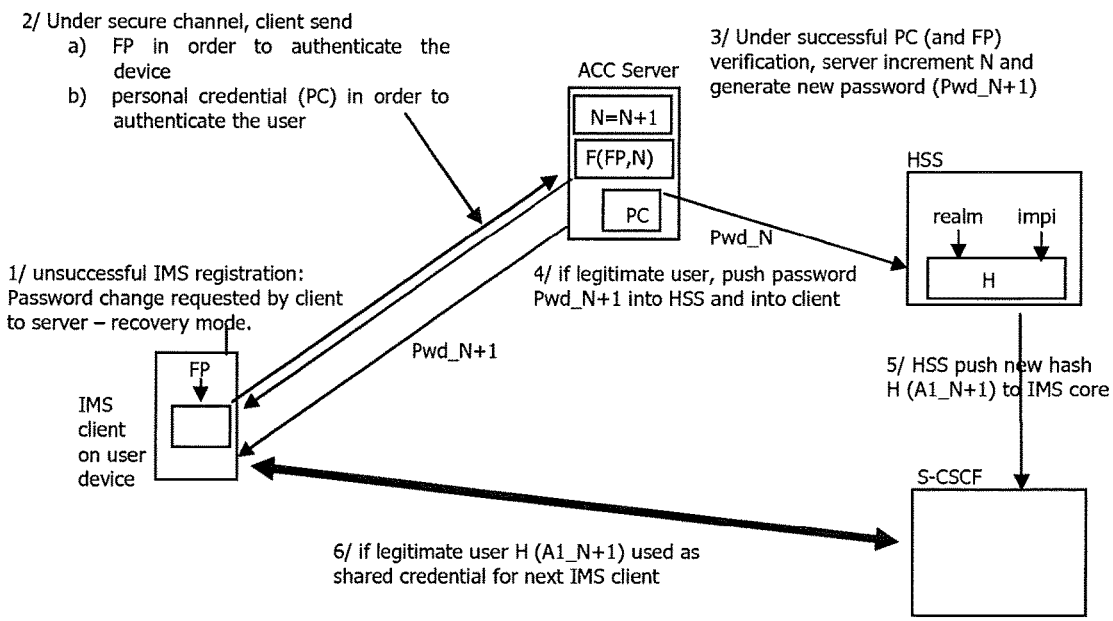
FIG. 8 is another example of diagram showing password management when a clone has been detected according to the invention in IP Multimedia Subsystem (IMS) framework.

FIG. 8 illustrates the management of service access when a clone has been detected in IP Multimedia Subsystem (IMS) framework according to an example of the invention.

At first step, an unsuccessful IMS registration is assumed to have been performed based on the current active password Pwd_N. In other words, authentication of the IMS client to S-CSCF failed. In a preferred example, the IMS client initiates the password change by sending a request to the ACC server.

Alternatively, the server can take the initiative to replace the current password Pwd_N with a new one.

In both cases, the anti-clone code renewal is performed in recovery mode through a secure channel established between the IMS client and the ACC server.

At second step, the IMS client gets the fingerprint FP of the tablet and sends authentication data to the ACC server. This authentication data allows the ACC server to verify that the IMS client knows the fingerprint FP and the personal credential PC. For example, the authentication data may comprise the personal credential PC concatenated to the fingerprint FP.

At third step, the ACC server verifies the received authentication data. In case of successful verification, the ACC server generates a new password Pwd_N+1, else the process is stopped.

At fourth step, the ACC server sends the new password Pwd_N+1 to the IMS client via the secure channel and to the HSS.

At fifth step, the HSS generates a new hash H(A1_N+1) from the password Pwd_N+1 and the client identifier. Then HSS send this new hash H(A1_N+1) to the S-CSCF (also called IMS core).

The IMS client has now the new anti-clone code which is required to the next access to the service.

As shown at sixth step, the IMS client will authenticate to the S-CSCF based on the hash H(A1_N+1) for the next attempt to access the service.

It is to be noted that all above described optional items presented in only one example may apply in any embodiment of the invention.

The invention allows decreasing the attack window for an attacker. If the attacker clones the genuine client application and cannot connect before the next change of anti-clone code, the cloned application remains useless; knowing that the server will deny simultaneous access to a service by a particular client. In addition, if the attacker succeeded to connect the service and the genuine client wants to connect, the clone application will be detected and can be disconnected.

Thanks to the invention, the login/password for a pure software application may be implemented in a way convenient for the user. The password may be stored in the application itself, allowing to access the targeted service without asking the user to enter the password. The user will be requested to provide a personal credential (identity data) only in case of detection of a clone.

It must be understood, within the scope of the invention that the above-described embodiments are provided as non-limitative examples. In particular, the client application may comprise any number of credentials allowing to access as many services.

The architectures of server shown at FIG. 5-8 are provided as example only. In particular, the server SV may be implemented in a unique machine or any number of machines.

The invention claimed is:

1. A computer-implemented method for managing access to a service, wherein said method comprises the steps:

receiving, by an application server, from a client application, a request to access the service by using credentials and a first anti-clone code previously provided by the application server, in response to receipt of the request, performing, by the application server, a verification of the credentials and said first anti-clone code, and only in case of successful verification of the credentials and said first anti-clone code, both sending by the application server a second anti-clone code to the client application and deactivating, by the application server, said first anti-clone code, said second anti-clone code being required for the next attempt to access the service.

2. A method according to claim 1, wherein the application server has previously recorded a restoring data associated with the client application, wherein the client application is allocated to a user, wherein in case of failure of the verification, the application server asks the user to send an identity data and wherein if the identity data is compliant with the restoring data the application server authorizes access to the service and sends to the client application a new anti-clone code required for the next attempt to access the service.

3. A method according to claim 1, wherein the application server has previously recorded a restoring data associated with the client application, wherein the client application is allocated to a user, wherein a cloned client application was granted access to the service by using an anti-clone code stolen to the client application, wherein the application server asks the user to send an identity data and wherein if the identity data is compliant with the restoring data, the application server removes access to the service for the cloned client application, authorizes the client application to access the service and sends to the client application a new anti-clone code required for the next attempt to access the service.

4. A method according to claim 1, wherein said first and second anti-clone codes are used by the client application as passwords or keys.

5. A hardware application server configured to provide a service to a client application, said application server being configured to establish a secure and authenticated session with the client application, wherein the application server includes instructions stored thereon that, when executed, cause said application server to:
   send a first anti-clone code to the client application through said session,
   in response to the receipt of a request sent by the client application, verify that said request has been to correctly generated using credentials and the first anti-clone code, and
   only in case of successful verification, send a second anti-clone code to the client application and to deactivate said first anti-clone code, said second anti-clone code being required for the next attempt to access the service.

6. An application server according to claim 5, wherein the application server is configured to record a restoring data associated with the client application during an enrollment stage, wherein the client application is allocated to a user, and wherein in case of failure of the verification, the application server is configured to ask the user to send an identity data and wherein if the identity data is compliant with the restoring data, the application server is configured to authorize access to the service and to send to the client application a new anti-clone code required for the next attempt to access the service.

7. An application server according to claim 5, wherein the application server is configured to authorize access to the service by one client entity at a time, wherein the application server is configured to record a restoring data associated with the client application during an enrollment stage, wherein the client application is allocated to a user, wherein if a cloned client application was granted access to the service by using an anti-clone code stolen to the client application, the application server is configured to ask the user to send an identity data and wherein if the identity data is compliant with the restoring data, the application server is configured to remove access to the service for the cloned client application, to authorize the client application to access the service and to send to the client application a new anti-clone code required for the next attempt to access the service.

8. An application server according to claim 5, wherein the application server is configured to check that said first and second anti-clone codes are used by the client application as passwords or keys.

9. An application server according to claim 5, wherein the application server is configured to record a fingerprint of a device embedding the client application and wherein the application server is configured to check that said credentials include the fingerprint.

10. A non-transitory computer readable medium storing a client application designed to access a service, said client application being configured to establish a secure and authenticated session with a first server,
    wherein said client application is configured to send to a second server a request for accessing the service, the client application is configured to generate said request using both credentials and a first anti-clone code previously provided by said first server through said session and said client application is configured to ask said first server to send a second anti-clone code required for the next attempt to access the service and to deactivate said first anti-clone code, if said request has been successfully accepted by said second server.

11. A non-transitory computer-readable medium according to claim 10, wherein the first server stores a restoring data associated with the client application, wherein the client application is allocated to a user and wherein said client application is configured to ask said first server to start a process of anti-clone code renewal based on an identity data provided by the user and intended to be checked versus the restoring data by the first server, if said request has been rejected by said second server.

\* \* \* \* \*